United States Patent [19]
Misono et al.

[11] 3,715,405
[45] Feb. 6, 1973

[54] PROCESS FOR SELECTIVE HYDROGENATION OF HIGHLY UNSATURATED COMPOUNDS

[75] Inventors: Akira Misono; Ikuei Ogata, both of Tokyo, Japan

[73] Assignee: Nippon Oil Company Limited, Tokyo, Japan

[22] Filed: Dec. 22, 1970

[21] Appl. No.: 100,844

Related U.S. Application Data

[63] Continuation-in-part of Ser. No. 772,416, Oct. 31, 1968, abandoned.

[30] Foreign Application Priority Data

Nov. 6, 1967 Japan..............................42/70924

[52] U.S. Cl. ............................................260/666 A
[51] Int. Cl. ..........................C07c 5/14, C07c 5/16
[58] Field of Search...................................260/666 A

[56] References Cited

UNITED STATES PATENTS

| | | | |
|---|---|---|---|
| 3,592,862 | 7/1971 | Fahey | 260/666 A |
| 3,308,177 | 3/1967 | Atkins | 260/666 A |

*Primary Examiner*—Delbert E. Gantz
*Assistant Examiner*—Veronica O'Keefe
*Attorney*—Wenderoth, Lind & Ponack

[57] ABSTRACT

A process for the selective hydrogenation of cyclododecatriene to produce cyclododecene in the presence of hydrogen at a temperature from 100° to 300°C using, as a catalyst, a cobalt complex compound having three ligands of carbon monoxide and one ligand of phosphine per one atom of cobalt.

4 Claims, No Drawings

PROCESS FOR SELECTIVE HYDROGENATION OF HIGHLY UNSATURATED COMPOUNDS

This application is a continuation-in-part of copending application, Ser. No. 772,416 filed Oct. 31, 1968 now abandoned.

This invention relates to a novel process for a selective hydrogenation of cyclododecatriene to produce cyclododecene, using as the catalyst a cobalt complex compound having three ligands of carbon monoxide and one lignad of phosphine per one atom of cobalt.

A process of selective hydrogenation of a highly unsaturated compound having two or more of unsaturated bonds to a monoene compound without changing the carbon chain structure, or a process of selective hydrogenation of a highly unsaturated compound which coexists with monoenes is of high industrial value, and for a long time satisfactory process for effecting such selective hydrogenation has extensively been looked for. Especially selective hydrogenation of cyclododecatriene to produce cyclododecene has been looked for.

In general, most of prior studies on the hydrogenation of unsaturated compounds have been made using Ni, Pd, Pt and the like as the catalyst. These catalysts however exhibit but little selectivity in the hydrogenation of highly unsaturated compounds so that hydrogenation proceeds to completely saturated compounds and it is difficult to obtain monoene compounds retaining one unsaturated bond with good selectivity. Consequently, trials have been made to effect selective production of monoene compounds using hydrogenation catalysts of other types. Many of such catalysts are solid hydrogenation catalysts having modified compositions or solid hydrogenation catalysts to which an addition agent has been added to control the activity to some extent and to produce selectivity. But selectivity obtained with such catalysts was unsatisfactory.

For example, a method of selective hydrogenation using $MoS_2$, NiS and the like is described in J.A.C.S., 337,74(1952); a method using reduced nickel is described in U.S. Patent No. 3,244,854; a method using $NiS_2$ is described in British Pat. No. 1,028,499, and a method using Raney nickel is described in French Pat. No. 1,857,114. However, selectivity attained in these methods are poor and large amounts of byproducts such as saturated hydrocarbon, and decomposed and/or polymeric products are formed.

U.S. Pat. No. 3,303,228 describes hydrogenation for a short period in a tubular reactor using cobalt carbonyl as the catalyst. However, this method requires reaction conditions of 150° – 250°C under 100 atm. in the presence of a considerable amount of catalyst. Yet the selectivity is poor and considerable amounts of saturated hydrocarbon and other byproducts are formed. U.S. Pat. No. 3,308,117 describes hydrogenation using cobalt carbonyl as the catalyst in the presence of carbon monoxide. This method requires similar reaction conditions as those of U.S. Pat. No. 3,308,228 and has also the disadvantage of forming large amounts of oxygenated compounds as the byproducts.

While, a hydroformylation process using cobalt carbonyl complex catalyst is disclosed in British Pat. No. 1,049,291 and hydrogenation of unsaturated compound using also cobalt carbonyl complex catalyst is disclosed in British Pat. No. 942,435, however, there is no disclosure at all about the process for the selective hydrogenation of cyclododecatriene to produce cyclododecene, which has been accepted by those skilled in the art as one of the most difficult process up to now.

An object of this invention is to provide a novel process for the selective hydrogenation of cyclododecatriene to produce cyclododecene which does not have the disadvantages of prior processes and which has not desclosed before. Further object of this invention is to provide a novel process for the selective hydrogenation of cyclododecatriene to cyclododecene with a selectivity above 99 percent under mild reaction conditions.

Above objects have been attained according to this invention by hydrogenating a cyclododecatriene in the presence of hydrogen at a temperature from 100° to 300°C using, as a catalyst, a cobalt complex compound having three ligands of carbon monoxide and one ligand of phosphine per one atom of cobalt.

The term "phosphine" used herein is to include phosphorus compounds which may be regarded as derivatives of $PH_3$, i.e. phosphorus compounds having aliphatic, cycloaliphatic and/or aromatic radicals bonded by any of the three valencies of the phosphorus atom. Typical examples of such phosphines are trimethylphosphine, triethylphosphine, tri-n-butylphosphine, diethylcyclohexylphosphine, triphenylphosphine, tritolyphosphine and the like. Phosphine described herein can also have two or more than two valencies of phosphorus atom satisfied by one hydrocarbon radical, for example, two valencies by one alkylene radical. Phosphine described herein may also be a polynuclear phosphine containing two or more than two phosphorus atoms.

Catalyst used in the process of this invention is a cobalt complex having three ligands of carbon monoxide and one ligand of phosphine per one atom of cobalt, i.e. a cobalt complex having three carbonyl groups and one phosphine group as the coordinating groups connected to cobalt atom each at least by one coordination linkage. Commonly, such cobalt complex is derived from cobalt carbonyl by replacing some of the carbonyl groups of the cobalt carbonyl by phosphine and some of the remaining carbonyl groups by hydrogen and/or an organic group. Examples of such cobalt complex which may be used as catalyst in the process of this invention are $HCo(CO)_3(Phosphine)$, $[Co(CO)_3(Phosphine)]_2$, $(Alkyl-)Co(CO)_3(phosphine)$, $(Aryl-)Co(CO)_3(Phosphine)$, $(Acyl-)Co(CO)_3(Phosphine)$, $[Co(CO)_3(Phosphine)_2][Co(CO)_4]$ and the like.

According to this invention, cyclododecatriene is hydrogenated in the presence of hydrogen using above described catalyst in a solvent or without using solvent. Use of a catalyst system which will produce such cobalt complex in the reaction system is also within the scope of this invention. For example, cobalt carbonyl and phosphine can be introduced into the reaction system separately to produce the active cobalt complex in the mixture.

We have found that when cyclododecatriene is hydrogenated in the presence of cobalt complex described above, cylododecene is obtained with a selectivity above 99 percent. We have also found that high catalytic activity of the cobalt complex and high yield of monoene compound can be obtained under mild conditions.

In order to make the nature of this invention more clear, presumed reaction mechanism involved in the process of this invention will be set forth below without intending to restrict the invention in any way thereby. Under the reaction conditions of this invention it can be thought that the cobalt complex is readily converted to its hydride which in turn adds to the $\pi$-bonds of the highly unsaturated compound and activates the compound to take up hydrogen molecules for the effective hydrogenation. The behavior in this regard of the cobalt complex is higher than that of conventional hydrogenation catalyst such as Pt, Ni, NiS and the like so that higher selective activity is obtained and the reaction can be proceeded at moderate reaction conditions. And it can also be thought that higher selectivity is due to the isomerization which readily takes place by the addition and reliberation of the cobalt complex hydride to and from the highly unsaturated compound under the reaction conditions of this invention. By this isomerization unsaturated bonds in the highly unsaturated compound are shifted to conjugated positions when they were not conjugated initially.

Conjugated diene structure resulting from this isomerization combines with the cobalt complex hydride and forms an intermediate complex having high coordination stability in preference to non-conjugated and monoene structures. Intermediate complex of the diene structure and cobalt complex thus formed activates hydrogen molecules in the reaction system and promotes the diene structure to take up the hydrogen molecules to add to the unsaturated bonds. It can be thought that when the conjugated diene structure in the intermediate complex is hydrogenated to monoene structure the intermediate complex is deactivated and the cobalt complex hydride is re-liberated. The re-liberated cobalt complex is now taken up in coordination with diene structure remaining in the reaction mixture.

Accordingly, so long as highly unsaturated compounds having higher unsaturation remain in the reaction mixture, hydrogenation to monoene structure continues and hydrogenation of monoene structure does not take place until all of the highly unsaturated compounds having higher unsaturation than monoene structure are consumed.

In our copending U.S. Pat. application Ser. No. 547,795 entitled "Selective hydrogenation using transition metal catalyst" there is described a process for the selective hydrogenation of polyene compounds to monoene compounds using a catalyst system prepared by reducing a complex compound soluble in organic solvent of transition metal of group VIII of the Periodic Table with triethylaluminum and the like. Some polyene compounds having certain structure did not show good reactivity in this process. For example, cyclododecatriene which, due to the carbon atom skeletal structure of the molecule, cannot have perfectly plane conjugated diene structure by isomerization, did not show good reactivity. It has been found that when the catalyst system of this invention is used, not only common highly unsaturated compounds but also highly unsaturated compounds which are difficult to take perfectly plane diene structure on isomerization can be hydrogenated with excellent reactivity and selectivity to the corresponding monoene compounds. For example, cyclododecene is prepared satisfactorily from cyclododecatriene when a catalyst system containing $[Co(CO)_3P(n-C_4H_9)_3]_2$ is used according to this invention. This is attributed to the presence of phosphine in the catalyst as one ligand.

The process of this invention can be conducted at a temperature within the range of 100° – 300°C and under autogeneous or a hydrogen pressure of 0 – 100 atm. Pressure governs only the reaction rate. The process of this invention may be carried out in the presence of a solvent or without using solvent. Solvent, when used, may be any of common organic and inorganic solvents provided it does not deactivate the catalyst significantly under the reaction conditions. Particularly useful solvents are tetrahydrofuran, alcohols, dialkylethers, esters, aromatic and aliphatic hydrocarbons, etc.

In order to carry out the process of this invention effectively, it is preferred to stop the reaction at a point at which the reaction mixture still contains highly unsaturated compounds in amount significantly above equimolar to the amount of catalyst. Alternatively, fresh highly unsaturated compound may be added before highly unsaturated compounds disappear or a lower diolefin such as butadiene or isoprene may be added to the reaction mixture in an amount above equimolar to the amount of catalyst to prevent overhydrogenation of the monoene compound.

Reaction mixture in which the reaction has been stopped at a point at which the mixture still contains highly unsaturated compounds in amount significantly above equimolar to the amount of catalyst or in which overhydrogenation of the monoene compound has been stopped by the addition of a lower diolefin is then subjected to conventional procedure such as stripping to recover the disired monoene compound. Catalyst is recovered as an oily residue. The recovered catalyst was found to have similar activity as the fresh catalyst when reused and it is one feature of this invention that the catalyst can be recovered and reused in such manner.

The following examples are presented for the purpose of illustrating this invention and advantages thereof. It will be understood that this invention is not limited by these examples.

EXAMPLE I 50 ml autoclave equipped with an agitator was dried and purged with dry nitrogen gas and 1.9 millimols of a cobalt complex consisting essentially of $[Co(CO)_3P(n-Bu)_3]_2$ prepared by reacting 3 millimols of octacarbonyl dicobalt $Co_2(CO)_8$ and 10 millimols of tri-n-butylphosphine in benzene at 50°C. were placed therein. 20 ml of benzene and 132 millimols of 1,5,9-cyclododecatriene (t,t,t- 88.4 percent, cis,t,t-9.8 percent, others 1.8 percent) and then hydrogen were introduced into the autoclave to a pressure of 30.1 atm. The autoclave was sealed and heating was commenced. When the temperature reached 140°C hydrogen absorption began. The reaction was continued for further 90 minutes at the end of which the temperature was 160°C, the reaction was terminated by quenching.

The reaction mixture was subjected to distillation under reduced pressure to separate the reaction products from catalyst, which remained as residue, products thus separated were analyzed by gas chromatography using a column filled with DIASOLID-M [1,2,3-tris(β-aminoethyl)propane]. Results obtained are shown in the following Table I.

Table I

| Component | % by weight |
|---|---|
| Cyclododecane | 0.4 |
| trans-Cyclododecene | 67.7 |
| cis-Cyclododecene | 31.9 |
| Cyclododecadiene | 0 |
| Cyclododecatriene | 0 |
| Oxygenated compounds | 0 |

EXAMPLE II

In an autoclave having a capacity of 50 ml which has preliminarily been dried and purged with nitrogen, 20 ml of n-hexane, 66 millimols of 1,5,9-cyclododecatriene, 0.88 millimol of octacarbonyl dicobalt and 3.4 millimols of trimethylphosphine were placed. Then hydrogen was introduced to a pressure of 30.0 atm. Temperature was raised by heating and at 140°C hydrogen absorption was observed to commence. Reaction was continued for a period of 20 minutes with addition of hydrogen. Pressure at the end of the reaction period was 28.6 atm. Reaction was stopped by quenching.

The reaction mixture was analyzed by gas chromatography. No metallic cobalt was detected. As comparison same procedure was repeated except that the addition of phosphine was omitted. In this case, hydrogen absorption commenced at 130°C. but stopped immediately and again commenced when the temperature was raised to 160°C. Precipitation of metallic cobalt was observed.

Results of the analysis of the reaction mixtures are shown in the following Table II.

Table II

| Component | Example II % by wt. | Control (A)* (130°C.) % by wt. | Control (B)* (160°C.) % by wt. |
|---|---|---|---|
| Cyclododecane | 0.5 | 0 | 5 |
| trans-Cyclododecene | 66.8 | 10 | 24 |
| cis-Cyclododecene | 32.7 | 2 | 15 |
| Cyclododecadiene | 0 | 23 | 0 |
| Cyclododecatriene | 0 | 64 | 0 |
| Oxygenated compounds | 0 | | |

* Catalysts containing no phosphine

COMPARATIVE EXAMPLE I

A selective hydrogenation of cyclododecatriene using a compound $HCo(PBu_3)_4$ as a catalyst was intended. The experiment could not be carried out because $HCo(PBu_3)_4$ is unstable except in the extremely low temperature condition.

COMPARATIVE EXAMPLE II $H_3Co(P\phi_3)_3$ ("$\phi$" represents phenyl group) was used as a catalyst.

A catalyst $H_3Co(P\phi_3)_3$ in the amount of 20mg which was obtained by causing to react cobalt acetylacetonato $(Co(AcAc)_3)$, ter-butylaluminium $(Al(ter-Bu)_3)$ and excess triphenylphosphine under normal temperature; 1 ml of 1,5,9-cyclododecatriene; and 5 ml of benzene, was previously dried and they were introduced into 50 mol autoclave with agitator which was filled with nitrogen gas, and caused to react for 1 hour at a temperature of about 80°C and a pressure of 50 atm. with a supply of hydrogen gas.

The reaction products were as follows:

| | |
|---|---|
| Cyclododecane | 16 wt% |
| Cyclododecenes | 41 wt% |
| Cyclododecadiene | 27 wt% |
| Cycldodecatriene | 16 wt% |

From this result, it was understood that the selectivity of this reaction was inferior because considerable amount of cyclododecane was produced while unreacted cyclododecatriene, remained.

COMPARATIVE EXAMPLE III $HCo(CO)(P\phi_3)_3$ was used as a catalyst, which was obtained by causing the catalyst used in the Comparative Example II to react with carbon monoxide, and hydrogenation was carried out in the same conditions as Comparative Example II except that the reaction temperature was raised. The reaction started at a temperature of 150°C and the reaction was continued for 2 hours.

The reaction products were as follows:

| | |
|---|---|
| Cyclododecane | 10 wt% |
| Cyclododecenes | 60 wt% |
| Cyclododecadiene | 25 wt% |
| Cyclododecatriene | 5 wt% |

As similar as the Comparative Example II, the catalyst of this Example was not good in the selectivity.

COMPARATIVE EXAMPLE IV $HCo(CO)_2(P\phi_3)_2$ was used as a catalyst.

Into an autoclave as used in Comparative Example II, 32 mg of $[Co(CO)_4]_2$, 98 mg of $P\phi_3$ (P/Co = 2) and 5 ml of toluene were fed, and further hydrogen gas was introduced up to 37 atm., Then they were kept at a temperature of 90°C for 1 hour. Thus $HCo(CO)_2(P\phi_3)_2$ was produced in the reaction system, and then 2.5 ml of cyclododecatriene was added into said reaction product, and the temperature was raised. The reaction with cyclododecatriene started at a temperature of 150°C, and after about 50 minutes, the reaction proceeded no more.

The reaction products were as follows:

| | |
|---|---|
| Cyclododecane | 4 wt% |
| Cyclododecenes | 51 wt% |
| Cyclododecadiene | 30 wt% |
| Cyclododecartiene | 15 wt% |

As the result of this example, it will be understood that the selectivity of the catalyst is not good as well as that the catalytic activity thereof is inferior. It is considered that said inferior catalytic activity is due to the fact that one of phosphine which is a ligand of the catalyst $HCo(CO)_2(P\phi_3)_2$ is liable to dissolciate, and $HCo(CO)_2(P\phi_3)$ is produced and further the compound is decomposed.

COMPARATIVE EXAMPLE V

As a catalyst, $HCo(CO)_2PBu_3$ was used.

Into an autoclave as used in Comparative Example II, 40 mg of $\pi$-allyl-$Co(CO)_2PBu_3$, 1 ml of cyclododecatriene and 4 ml of benzene were fed and the pressure was raised up to 34 atm. by introducing hydrogen gas. In the reaction system, $HCo(CO)_2PBu_3$ was produced, and at about 60°C, consumption of hydrogen was observed. The reaction was continued for 1 hour at a temperature of about 80°C, and after that the reaction did not proceed any more.

The reaction products were as follows:

| | |
|---|---|
| Cyclododecane | 45 wt% |
| Cyclododecenes | 35 wt% |
| Cyclododecadiene | 7 wt% |
| Cyclododecatriene | 13 wt% |

As the result of the above, it is understood that the catalyst of this Example is inferior not only in the selectivity but also in the catalytic activity and that the catalyst is decomposed.

COMPARATIVE EXAMPLE VI $HCo(CO)_2(\phi_2P-(CH_2)_2-P\phi_2)$ was used as a catalyst.

Into an autoclave as used in Comparative Example II, 131 mg (0.33 m mol) of 1,2-bis(diphenylphosphino)ethane, 56.6 mg (0.165 m mol) of $[Co(CO)_4]_2$ and 10 ml of benzene were fed, and further hydrogen gas was introduced, then they were caused to react under the conditions of at a temperature of 100°C, at a pressure of 45 atm. and for 50 minutes, thus the catalyst was prepared, thereafter 3 ml of 1,5,9-cyclododecatriene was added and the temperature was raised. At 150°C, hydrogen was consumed which showing the start of hydrogenation reaction, and even the temperature was raised up to 180°C, the consumption of hydrogen was very slow. At last after 2 hours from the start of the reaction, the reaction proceeded no more.

The reaction products were as follows:

| | |
|---|---|
| Cyclododecane | 4 wt% |
| Cyclododecenes | 22 wt% |
| Cyclododecadiene | 62 wt% |
| Cyclododecatriene | 12 wt% |

It is understood from this result that the catalyst of this Example is inferior not only in the selectivity but also in the catalytic activity. It is considered that the catalyst decomposed in the reaction system.

COMPARATIVE EXAMPLE VII $HCo(CO)_2(\phi_2P-(CH_2)_4-P\phi_2)$ was used as a catalyst.

Into an autoclave as used in Comparative Example II, 103 mg (0.27 m mol) of 1,4-bis(diphenylphosphino)butane, 41.5 mg (0.12 m mol) of $[Co(CO)_4]_2$ and 4 ml of toluene were fed, and further hydrogen gas was introduced and the mixture was caused to react at a temperature of 100°C, at a pressure of 35 atm. and for 30 minutes, thus the catalyst was produced. Then, 1 ml of cyclododecatriene was added into said mixture and the temperature was raised. The reaction started at 165°C, however, the consumption of hydrogen was slow, and then the temperature was raised up to 170°C, however, the reaction stopped after 60 minutes.

The reaction products were as follows:

| | |
|---|---|
| Cyclododecane | 4 wt% |
| Cyclododecenes | 47 wt% |
| Cyclododecadiene | 43 wt% |
| Cyclododecatriene | 6 wt% |

As same as Comparative Example VI, the catalyst of this Example was inferior in the selectivity and activity.

What is claimed is:

1. A process for the production of cyclododecene by the selective hydrogenation of cyclododecatriene which consists essentially of contacting cyclododecatriene with hydrogen at a temperature from 100° to 300°C using, as a catalyst, a cobalt complex compound having three ligands of carbon monoxide and one ligand of phosphine per one atom of cobalt.

2. A process according to claim 1, in which the reaction is terminated when substantially all of cyclododecatriene has been converted to cyclododecene.

3. A process according to claim 1, in which the catalyst is formed in the reaction system.

4. A process according to claim 2 in which the catalyst is formed in the reaction system.

* * * * *